Feb. 13, 1940.  F. GUTZMANN  2,189,896
PHASE MODULATION INDICATOR
Filed Sept. 14, 1937
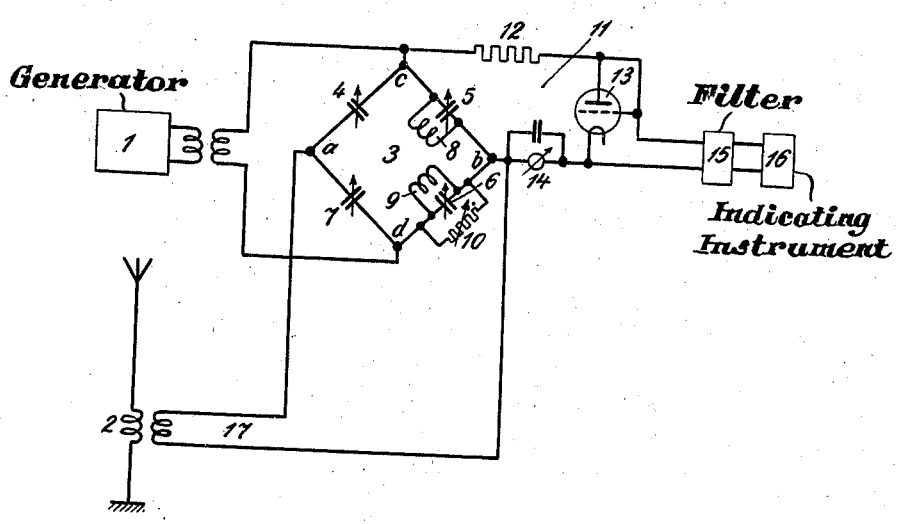
Inventor:
Fritz Gutzmann
by R. C. Hopgood
Attorney Patented Feb. 13, 1940

2,189,896

UNITED STATES PATENT OFFICE 2,189,896

PHASE MODULATION INDICATOR

Fritz Gutzmann, Berlin, Germany, assignor to C. Lorenz Aktiengesellschaft, Berlin-Tempelhof, Lorenzweg, Germany, a company Application September 14, 1937, Serial No. 163,770
In Germany September 14, 1936

2 Claims. (Cl. 250—17)

It has been proposed to measure the phase modulation of high frequency transmitters by superimposing upon the phase modulated alternating voltage a non-modulated alternating voltage of the same frequency and by using the variation of the rectified combination voltage or beat frequency in order to measure the phase modulation. In this way the phase modulation is converted into an effective amplitude modulation for the purpose of measurement. This conversion may be accomplished in a known manner as explained on pages 70 and 71 of volume 3/4 of "Lorenz-Berichten" 1936, in an article entitled "Ein neues Gerät zur Messung von Phasenmodulationen" by F. Gutzmann. A carrier wave of correct phase and amplitude is added to the phase modulated carrier so that the resultant carrier is in phase with the side bands created by the phase modulation, so that the modulations appear as amplitude variations of the resultant added carriers. The manner in which adjustment of the carrier frequency added to the modulated wave is obtained is not a feature of my invention and therefore is not illustrated in detail, since known means are available for this purpose. In measuring arrangements of this kind difficulties arise through the fact that the frequency to be investigated reacts upon the superimposed frequency by influencing the generator of the constant or superimposed frequency at the output side thereof, this generator in most cases being of the electron tube type.

In order to avoid this disadvantage it is proposed by the invention to convey the two alternating voltages to a bridge arrangement which is given a special adjustment with respect to these voltages, as will be understood from the following description and be particularly pointed out in the appended claims, reference being had to the accompanying drawing which shows a wiring diagram of one embodiment of the invention.

In this drawing, 1 denotes a generator for producing the constant superimposed frequency while 2 designates the source of the phase-modulated frequency. These two alternating voltages are conveyed to a bridge 3 that comprises four condensers 4, 5, 6, 7, two inductances 8, 9, an ohmic resistance 10 and a rectifier circuit 11 connected in parallel with condenser 5. Circuit 11 comprises an ohmic resistance 12, a rectifying valve tube 13 and a current-measuring device or ammeter. The phase modulated or disturbed alternating voltage arriving from the current source 2 is supplied to points $a$, $b$ of bridge 3 while the constant alternating voltage from generator 1 is supplied to the bridge points $c$, $d$. Bridge 3 is so adjusted that with respect to the disturbed frequency the points $c$, $d$ are equipotential and cophasal, such relationship also applying to the points $a$, $b$, as regards the constant frequency. In order to obtain this adjustment all the operative members of the bridge are variable. The currents rectified by tube 13 are conveyed through filtering means 15 to an indicating instrument 16, for instance an amplifying voltmeter. Instrument 16 may be such that the disturbing phase modulation can be read off, or may be an acoustic or recording device. The supply leads 17 are preferably constituted by a cable with unipolar grounding.

The novel arrangement allows of indicating both phase modulation and frequency modulation, since these two are equivalent in physical relation.

It is of importance that in contra-distinction to other arrangements for measuring the phase modulation the novel arrangement acts to indicate the entire low frequency spectrum of the phase modulating frequencies, thus enabling the measurement to be made with the aid of an audio filter adequate to the sensitiveness of the human ear. To use a device of this character is absolutely necessary for ascertaining disturbing phase modulations, the actual measurement of these being only enabled by the novel arrangement.

What is claimed is:

1. A circuit arrangement for high frequency transmitters which comprises two alternating current sources one of which is of a constant frequency value while the energy from the other is subject to disturbances, a bridge comprising four impedance arms to which these two current sources are connected, one source being connected to two opposing points of this bridge and the other connected to two other opposing points thereof, means for adjusting the bridge, the adjusted bridge being equipotential at the points to which one of the said current sources is joined and equipotential also at the points to which the other current source is joined, means bridged across one of said impedance arms for rectifying the energy from the said current sources and a resistance simulating the impedance of said means for rectifying bridged across an associated arm of said bridge.

2. An arrangement according to claim 1, said means for rectifying operating on the beat frequency formed by the energy from the two current sources, and an instrument connected to said rectifying means for indicating disturbing phase modulation contained in this beat frequency.

FRITZ GUTZMANN.